United States Patent [19]

Markov et al.

[11] Patent Number: 4,515,254
[45] Date of Patent: May 7, 1985

[54] DEVICE FOR DAMPING IMPACT LOAD

[75] Inventors: Vladimir A. Markov; Vladimir N. Filatov; Ilya S. Kernasovsky; Ljudmila V. Gorina, all of Moscow, U.S.S.R.

[73] Assignee: Vsesojuzny Nauchno-Issledovatelsky Institut Textilno-Galantereinoi Promyshlennosti, Moscow, U.S.S.R.

[21] Appl. No.: 552,180

[22] PCT Filed: Feb. 24, 1982

[86] PCT No.: PCT/SU82/00008
§ 371 Date: Sep. 30, 1983
§ 102(e) Date: Sep. 30, 1983

[87] PCT Pub. No.: WO83/02903
PCT Pub. Date: Sep. 1, 1983

[51] Int. Cl.³ .............................................. A62B 35/00
[52] U.S. Cl. .................... 188/371; 280/805; 297/472
[58] Field of Search ............. 188/371, 375, 65.1, 188/65.2, 266, 268, 372, 373, 374, 376, 377; 297/470, 471, 472; 280/805; 66/192, 193, 194; 244/152, 122 B, 138 R

[56] References Cited

U.S. PATENT DOCUMENTS

| | | | |
|---|---|---|---|
| 3,444,957 | 5/1969 | Ervin, Jr. | 182/3 |
| 3,563,498 | 2/1971 | Haile | 188/268 |
| 3,827,660 | 8/1974 | Doolittle | 244/10 C |
| 3,861,744 | 1/1975 | Yamada et al. | 297/472 |
| 4,297,858 | 11/1981 | Blasberg et al. | 66/194 |

FOREIGN PATENT DOCUMENTS

| | | |
|---|---|---|
| 2233528 | 1/1975 | France ........................... 280/805 |
| 1260397 | 1/1972 | United Kingdom . |
| 1447740 | 8/1976 | United Kingdom . |
| 1458119 | 12/1976 | United Kingdom . |
| 820833 | 12/1978 | U.S.S.R. . |
| 816821 | 4/1981 | U.S.S.R. . |

Primary Examiner—Bruce H. Stoner, Jr.
Assistant Examiner—Alvin Oberley
Attorney, Agent, or Firm—Fleit, Jacobson, Cohn & Price

[57] ABSTRACT

The device comprises a flexible band, composed of two layers which are established by the band being folded back, which band is associated with an energy-absorbing member. The members are fashioned as a plurality of loops from an elastic long-sized material, which are fastened on the band between its layers. The loops of the band layers are consecutively interconnected by virtue of tricot knit in a direction from the ends of the band towards the place where it is folded back. One of the ends of the band may be connected to a stationary fixed support, while applied to the other end may be a load F directed to destruct the knit in a direction opposite to that of unknitting. The most promising practical application of the present invention lies with shock absorbers of safety belts for builders, erectors, mountaineers, as well as with automobile safety seat belts.

9 Claims, 9 Drawing Figures

DEVICE FOR DAMPING IMPACT LOAD

TECHNICAL FIELD

The present invention relates generally to safety engineering means and more specifically it relates to shock absorbers or dampers capable of absorbing the impact effect of kinetic energy by virtue of plastic deformation of the elements thereof at a preset load and elongation level.

BACKGROUND ART

The present invention can find most utility when applied for shock absorbers in safety belts of builders, erectors, mountaineers, as well as for automobile safety seat belts, that is, in the protection (safety) systems, wherein necessity arises under certain operating conditions to absorb excess kinetic energy at a level not exceeding maximum admissible values.

At present a great many types of devices for absorbing impact effect of kinetic energy are known to be in current use in the above-mentioned safety engineering means. The most promising is the application in such means the shock absorbing devices based on the various textile materials, whose action is relied upon plastic deformation of a single or several system of filament fibres, since the operation threshold and reliability of such devices are less subject to the effect of such factors as cold, heat, water, dust and dirt than, e.g., those in the friction-type devices, which enables the former shock absorbing devices to be regarded as versatile ones.

Known in the present state of the art is the construction of an automobile safety seat belt incorporating an additional damping device. The device consists of a load-carrying textile band or ribbon folded into a loop and stitched across with sewing threads. The thus-stitched-up loop is pressed against one of the ends of the band load-carrying portion and a sleeve is fitted onto the loop and the band end. Then one of the ends of the band load-carrying portion is held in the car body, and the other end, to the band of the safety seat belt. Once the load applied to the safety seat belt has exceeded the operation threshold of the damping device, first the sleeve is liable to destruct, then the sewing thread stitches do so, thus ensuring energy absorption.

The aforementioned damping device is disadvantageous in the technique of joining the load-carrying band with sewing threads to obtain a loop. The thread stitches should be arranged strictly square with the warp threads of the band and with the direction of load application, since even minute skews, which are practically inescapable, affect badly the possibility of simultaneous tearing-down of the sewing threads throughout the entire stitch length. This, in turn, might result in an uniform operation threshold of the device and hence in affected operational reliability of the shock absorber. Moreover, as practice has demonstrated that, when using textile bands 30 to 40 mm wide made from textile fibres having an ultimate breaking strength of from 65 to 70 gf/tex, it is difficult to produce damping devices featuring the operation threshold in excess of 200 kgf. It is likewise impossible in the known device to carry out a reliable nondestructive check for quality of sewing joint, which affects adversely the reliability of the device as well.

One more device for damping impact loads in a safety system is known in the art, comprising a flexible band having two vacant ends and made up of two layers formed due to its folding, said band being associated with an energy-absorbing means. The energy-absorbing means is made as a strap composed of two bands bonded together. One of the flexible band ends is connected to the car body, while the other end is associated to a bracket, which is likewise held to the car body. The bracket carries also a reel for one of the ends of the safety seat belt band to retain and wind up. In the case of an abrupt loading of the safety seat belt the reel provided with retainers, wedges up the band, thus preventing it from unreeling. As soon as a preset load is attained the bracket along with the reel is detached from the car body, whereupon the strap of the flexible band starts taking up load. As a result, the strap begins to split into two portions at a preset load and thus absorbing surplus kinetic energy.

However, it happens rather difficult to retain the operation threshold after a prolonged period of operation under diverse atmospheric conditions. Besides, the known device likewise offers no possibility of carrying out a nondestructive reliable check for quality of bonded joints both at the stage of production and under in-service conditions, which affects adversely the reliability of the device.

It is therefore a primary and essential object of the present invention to eliminate the disadvantages mentioned above, from which the aforediscussed devices for damping impact load suffer.

DISCLOSURE OF THE INVENTION

The invention is aimed at the provision of a device for damping impact load capable of assuring a broad range of reliable operation threshold values within 600 to 800 kgf, using flexible bands up to 50 mm wide and a simpler and more reliable construction of the energy absorbing means.

The aforementioned object is accomplished due to the fact that in a device for damping impact load in a safety system, comprising a flexible band having two layers formed by folding back said band and associated with an energy-absorbing means, accordance to the invention, the energy-absorbing means is fashioned as a plurality of loops made from a flexible long-sized material and attached to the band throughout its entire length on one side thereof and interposed between the layers thereof, all the loops of the band layers being consecutively interconnected through tricot knit and unknittable in a direction opposite to the direction of load application.

The height of each loop in the device is so selected as to provide at least three loops to freely interknit, of which one loop is from one of the band layers, while the other two loops belong to the opposite band layer.

It is likewise expedient that the device incorporate a stationary fixed support to which the band ends are secured rigidly, and a ring which embraces one of the band layers and is loosely interposed between the stationary support and a section of the interknitted loops so as to take up load applied thereto.

It is practicable that the device be provided with a stationary fixed support having a yoke rigidly held thereto, the web of said yoke being interposed between the section of the interknitted loops and the ends of the flexible band interconnected for a load to take up.

There may be used in the device in the capacity of a flexible band, a textile knitted band or ribbon, on at least one side of which at least one row of knitted loops is provided, made integral with said band and having their width less than the width of the knitted band itself.

The warp of the knitted band may incorporate at least one system of loop warp threads interposed between the ground warp threads, from which loop warp threads interknitted with the weft threads there are formed a number of interloop sections and a row of loops interconnected with the interloop warp sections through consecutively arranged linking sections composed of loop warp threads so that the linking sections of each loop are different in length, while the weft density of each loop rises in the direction from a longer to a shorter linking section.

Each of the band knitted loops may be twisted with respect to the linking sections and, besides, each of the loops may be substantially plain circular knit and may have a circular cross-section.

Such a construction arrangement of the device for damping impact load in a safety device makes it possible to obtain a reliable operation threshold value within 600 and 800 kgf using bands up to 50 mm wide and to effect a nondestructive reliable check for quality of the band after its manufacture and of the device as a whole by appropriately varying the linear dimensions of the loops, their spacing and the number of loop rows.

The essence of the invention resides in the following. Application of a device for damping impact load in a safety system, said device comprising a flexible band having two vacant ends and composed of two layers formed by its folding back, said band being associated with an energy-absorbing means fashioned as a plurality of loops from a flexible long-sized material, which loops are secured on the band throughout its entire length on one side thereof and interposed between its layers so as to interconnect said layers by consecutive interlinking them through tricot knit, makes it possible to utilize for absorbing kinetic energy the property of tricot knit to unknit from one end only, that is, from the end of knitting completion, whereas unknitting from the opposite end, that is, one of the knitting start, is quite impossible. Separation of the band layers from this end is possible only due to successive destruction of the loops. In its turn consecutive destruction of the loops is accomplished by successive absorption of the kinetic energy applied. In such a case the load at which consecutive destruction of the loop will occur may be governed by the strength of an individual loop, its height and loop spacing, as well as by the number of loop rows. Making the loops from a flexible long-sized material and their having a height suitable for carrying out a technological process of a free joining of the loops through tricot knit enables the device as a whole to retain adequate flexibility. The use in the device of a flexible band made up of two layers formed by its folding, provides for load taking up by the flexible band whenever all the loops interconnected by tricot knit have been destructed.

When the band ends are rigidly fixed to a stationary support the loops may be torn down by a ring that embraces one of the band layers and is freely interposed between the stationary support and the section of the interknitted loops. In this case load should be applied to the loops from the ring at the end from which their knitting has been started, i.e., at the end ensuring consecutive tearing-down of the loops rather than their unknitting. As soon as all the loops have been torn down the load is taken up by the flexible band at the place it is folded back.

The loops may also be torn down by the web of a yoke rigidly secured on the stationary fixed support. The yoke web should be interposed between the section of the interknitted loops and the flexible band ends interconnected to take up load. In such a case the load will also be taken up by the flexible band at the place of its folding back as soon as all the loops are destructed one after another.

The device may use, as a flexible band, a knitted band on one side of which there is provided at least one row of knitted loops made integral therewith, the width of said loops being less than the width of the band itself. The warp of the band may incorporate at least one system of loop warp threads interposed between the ground warp threads, from which loop warp threads interknitted with the weft threads there are formed a number of interloop band sections and a row of knitted loops interconnected with the interloop warp sections through consecutively arranged linking sections, which are composed of loop warp threads so that the linking sections of each loop are different in length, while the weft density of each loop rises in the direction from a longer to a shorter linking section. Such a structure of the loops adds more flexibility thereto and renders them twistable with respect to the linking sections, which facilitates the technological process of their uniting through tricot knit. It is also desirable, with the same aim in view that the loops have circular cross-section, which may be provided, in particular, by plain circular knit.

Generally speaking, textile knitted bands with loops are the most promising ones to be applied in such devices for damping impact load in safety systems. There may be provided one, two, or more rows of loops, the number of the loop rows and the band structure as a whole being selected depending upon the specific requirements imposed upon the device, as well as proceeding from the pattern-making ability of a loom. Such bands are suitable for making therefrom the devices for damping impact load featuring a reliable operation threshold within 600 and 800 kgf, the width of bands made from textile fibres having an ultimate breaking strength lying within 65 and to 70 gf/tex being up to 50 mm. The operation threshold of a device made up of knitted bands with loops is governed by the number of the warp threads per loop, by the height of a loop or, speaking more precisely, by the number of the weft picks per loop, and by the loop spacing or the number of the weft picks per interloop space of the band. In addition, the production techniques of bands with loops and the technological process of loop knitting and the construction arrangement of the device as a whole, utilizing the property of tricot knitting to unknit only in the direction opposite to that of knitting, make it possible to effect reliable nondestructive inspection for quality of finished products, which substantially enhances their operational reliability.

Adequate operational reliability of a device made of knitted bands with loops has been confirmed by its testing under diverse atmospheric conditions. Such a device made up of conventional polyamid fibres exhibits stable operation when wet, frozen at $-30°$ C. after having been poured with water, or frozen at $-30°$ C. when dry. Besides, trials of such devices at a load application rate of about 7 m/s have demonstrated the operation threshold to remain practically unaffected compared with the results of the static load tests. All this tells of the reliability of the concept of kinetic energy absorption due to destruction in such devices of loops interlinked through tricot knit. An adequately packaged design of devices made from knitted bands with loops enables such devices to be recommended for use as shock absorbers in the safety belts of builders, erectors, mountaineers, as well as in automobile safety seat belts.

BRIEF DESCRIPTION OF THE DRAWINGS

In what follows the invention will be illustrated in a detailed description of some specific embodiments thereof to be had in conjunction with the accompanying drawings, wherein.

BEST MODE OF CARRYING OUT THE INVENTION

Figure 1:
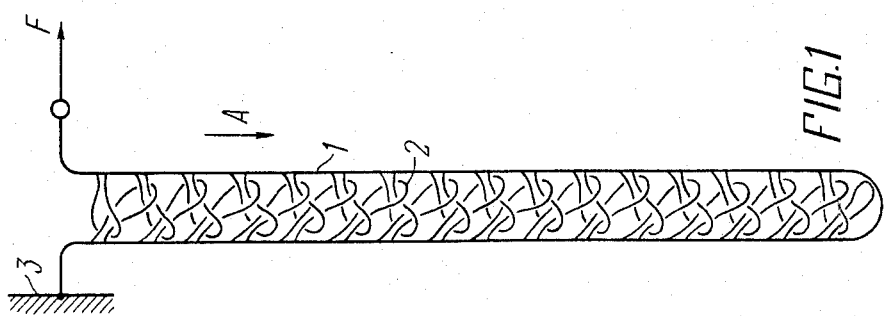
FIG. 1 is a side view of a device for damping impact load, according to the invention.

The device for damping impact load (FIG. 1), according to the invention, comprises a flexible band 1 having two free ends and made up of two layers formed by the band being folded back, said band being linked to an energy-absorbing means fashioned as a plurality of loops 2 made from a flexible long-sized material. The loops 2 are interlinked in succession through tricot knit in a direction from the band ends towards the place where it is folded back, which is shown by the arrow A in the Figure. The height of each loop 2 is large enough for such loop of one layer to get interknitted with the two loops 2 of the opposite layer. One of the ends of flexible band 1 is associated with a stationary fixed support 3, while a load F may be applied to the band other end.

Figure 2:
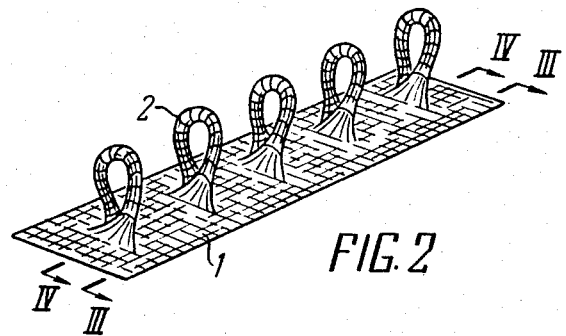
FIG. 2 is a general view of a flexible knitted band with loops.
Figure 3:
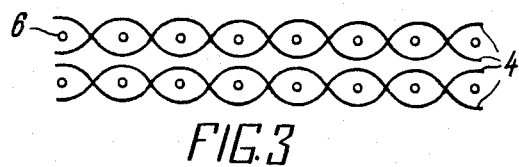
FIG. 3 is a section taken along the line III—III in FIG. 2.
Figure 4:
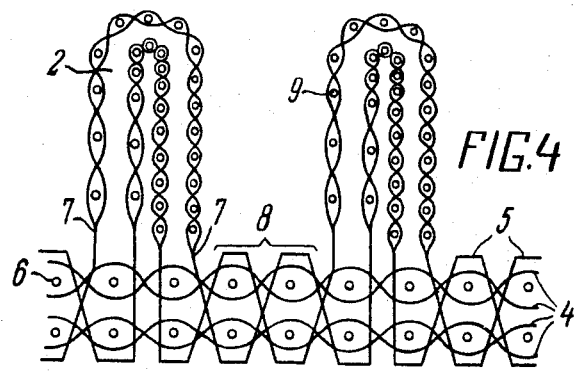
FIG. 4 is a section taken along the line IV—IV in FIG. 2.

Used as a flexible band may be any known bands, knitted ones inclusive. One of the practicable embodiments of the flexible knitted band 1 adapted for use in the device for damping impact load and featuring a plurality of flexible long-sized knitted loops 2 (FIGS. 2 through 4) situated on one side of said band and made integral therewith, comprises one system of ground warp threads 4, one system of loop warp threads 5 and one system of weft threads 6. The system of the ground threads 4 interknitted with the weft threads 6 by virtue of plain circular knit 3/1, $\frac{1}{3}$ forms a double-layer ground of the flexible band 1 (FIG. 3). The system of the loop warps threads 5 also interknitted with the weft threads 6 through plain circular knit 3/1, $\frac{1}{3}$, forms the double-layer loops 2, which are attached, through linking sections 7, to the ground of the flexible band 1 by virtue of the system of the loop warp threads 5, which is interknitted with the weft threads 6 in an interloop space 8 of the ground of the band 1 through the 2/2 knit (FIG. 4). The linking sections 7 of each loop 2 are different in length, while the weft density of each loop 2 increases in the direction from the longer linking section 7 to the shorter one (FIG. 4). Each loop 2 is twisted with respect to the linking sections 7 and has a circular cross-section (FIG. 2).

Figure 5:
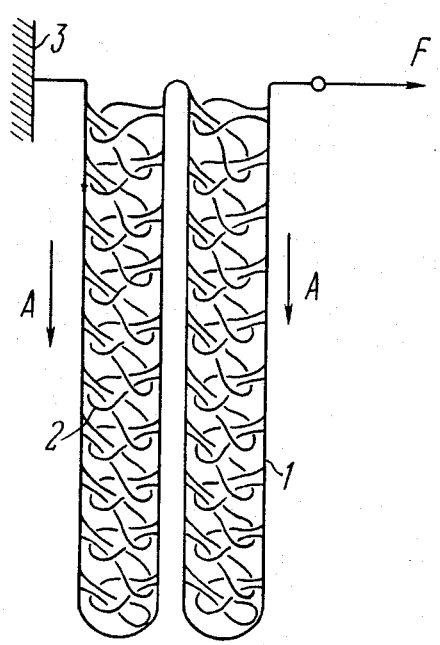
FIG. 5 is a view of the same device as shown in FIG. 1 but with a modified place of loop knitting start.

An embodiment of the construction arrangement of the device for damping impact load (FIG. 5), according to the invention, comprises the flexible band 1 having two free ends and composed of two layers formed by said band being folded back, said band being connected to an energy-absorbing means fashioned as a plurality of the loops 2 made from an elastic long-sized material. The loops 2 are consecutively interlinked through tricot knit in a direction from the band ends towards the places where the band is folded back as shown by the arrow A. One of the ends of the flexible band 1 is connected to the stationary fixed support 3, while a load F may be applied to the band other end.

Figure 6:
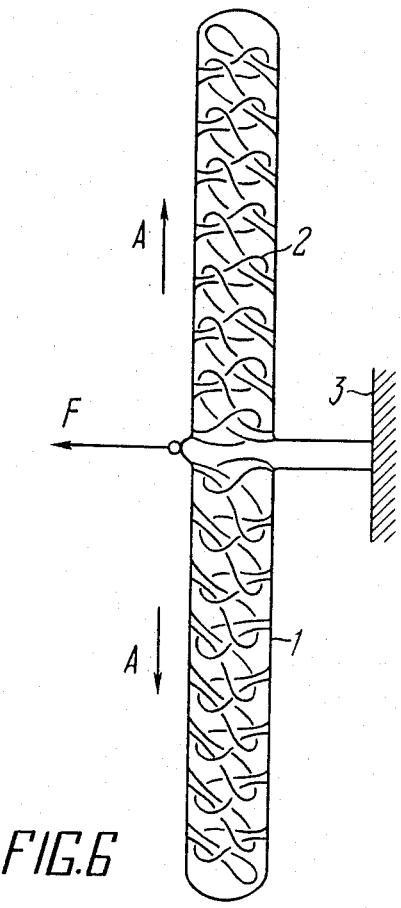
FIG. 6 is a view of the same device as shown in FIG. 1 but with a modified place of loop knitting start and a modified load application point.

Another embodiment of the construction arrangement of the device for damping impact load (FIG. 6), according to the invention, comprises the flexible band 1 having two free ends and composed of two layers formed by said band being folded back. The loops 2 are consecutively interconnected by virtue of tricot knit in a direction from the band ends towards the places where the band is folded back, which is shown by the arrow A. The ends of the flexible band 1 is connected to the stationary fixed support 3. In this embodiment a load F can be applied to the flexible band 1 at the point where the loops have been started to be knitted.

Figure 7:
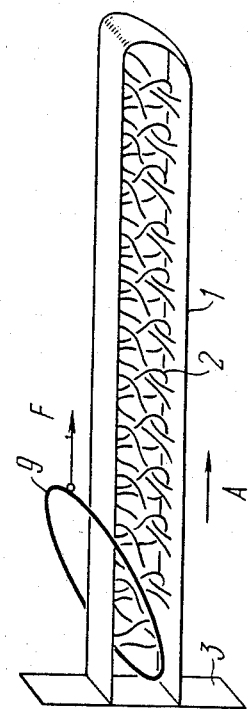
FIG. 7 is a modified embodiment of the device that makes use of a ring for applying a load thereto.

The device for damping impact load as shown in FIG. 7 comprises, according to the invention, the flexible band 1 built up of two layers formed by said band being folded back and associated with an energy-absorbing means made as a plurality of the loops 2 from an elastic long-sized material. The loops 2 are consecutively interconnected by virtue of tricot knit in a direction from the band end towards the place where it is folded back, which is shown by the arrow A. The band ends are rigidly fixed on the stationary support 3. The top end of the flexible band 1 at the stationary support 3 embraces a ring 9 so as to take up the load F applied thereto.

Figure 8:
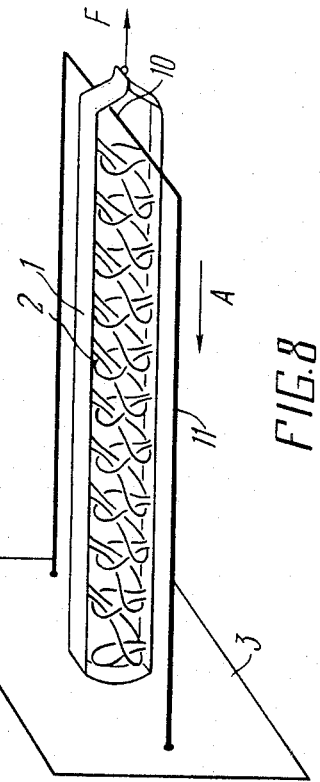
FIG. 8 is a modified embodiment of the device that makes use of a yoke for applying a load thereto.

The device for damping impact load as shown in FIG. 8 comprises, according to the invention, the flexible band 1 composed of two layers established by said band being folded back and connected to an energy-absorbing means, which is fashioned as a number of the loops 2 from an elastic long-sized material. The loops 2 are consecutively interconnected through tricot knit in a direction from the band ends towards the place where the band is folded back. A web 10 of a yoke 11 is interposed between the interconnected ends of the flexible band 1 and the section of the interknitted loops 2 at the place where the loops 2 have been started to the knitted. The ends of the yoke 11 are rigidly linked to the stationary fixed support 3. A load F may be applied to the interconnected ends of the flexible band 1.

The device for damping impact load in a safety system functions as follows.

Figure 9:
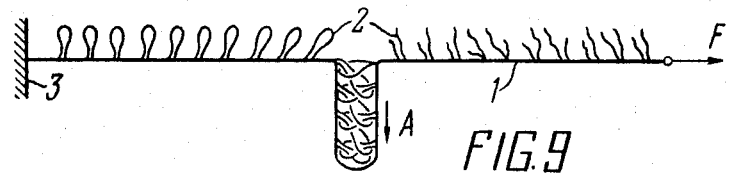
FIG. 9 illustrates the device, according to the invention, after it has been absorbed an impact load applied thereto.

When a load F is applied to the device for damping impact load (FIGS. 1, 5, 6), said load exceeding the strength of the loops 2 interlinked through tricot knit and being directed for separating the layers of the flexible band 1 at the end from where knitting of the loops 2 has been started as shown by the arrow A, this results in that the loops 2 get torn down one after another, whereby the kinetic energy applied is absorbed (FIG. 9).

When a load F is applied to the ring 9 in the device for damping impact load as shown in FIG. 7), said load exceeding the strength of the loops 2 interlinked through tricot knit and being directed from the stationary support 3 and the point from where knitting of the loops 2 has been started, towards the place where the band 1 is folded back, the results is that the loops 2 get torn down one after another, and the kinetic energy applied is thus absorbed.

When a load F is applied to the interlinked ends of the flexible band 1 in the device for damping impact load as shown in FIG. 8, said load exceeding the strength of the loops 2 interconnected through tricot knit and being directed away from the stationary support 3, this results in the loops 2 being torn down one after another and the kinetic energy applied is absorbed.

As distinct from the heretofore-known devices for damping impact load the present device makes it possible to realize more reliable concept of kinetic energy absorption, based on destruction of tricot knit in a direction opposite to the that of knitting within a wide range of the operation threshold values.

What is claimed is:

1. A device for damping impact load in a safety system, comprising a flexible band (1) having two free ends and made up to two layers, which are formed by said band being folded back, which band is associated with an energy-absorbing means, characterized in that the energy-absorbing means is fashioned as a plurality of loops (2) from an elastic long-sized material, said loops being fastened on the band (1) throughout its length on one side thereof and being interposed between the layers of the band, all the loops (2) of the band layers being interlinked consecutively through tricot knit capable of unknitting in a direction opposite to the direction of load application.

2. A device as claimed in claim 1, characterized in that the height of each loop (2) is so selected as to ensure free interknitting of at least three loops (2), of which one loop belongs to one of the layers of the band (1), while the two other loops pertain to the opposite layer of the band (1).

3. A device as claimed in claim 1, characterized in that it incorporates a stationary fixed support (3) to which the ends of the band (1) are rigidly secured, and a ring (9) embracing one of the layers of the band (1) and loosely interposed between the stationary support (3) and the section of the interknitted loops (2) so as to take up a load applied thereto.

4. A device as claimed in claim 1, characterized in that it incorporates a stationary fixed support (3) and a yoke (11) rigidly secured thereto, a web (10) of said yoke being interposed between the section of the interknitted loops (2) and the ends of the band (1) interconnected for a load to take up.

5. A device as claimed in claim 1, characterized in that used as the flexible band (1) is a knitted band on one of the sides of which there is provided at least one row of knitted loops (2) made integral with the band, the width of said loops being less than the width of the band (1) itself.

6. A knitted band as claimed in claim 5, comprising a warp made by interknitting ground warp threads (4) and weft threads (6), characterized in that interposed between the ground warp threads (4) of the warp is at least one system of loop warp threads (5) from which interloop sections (8) are formed by interknitting with the weft threads (6), and a row of the loops (2) interconnected with the interloop sections (8) of the warp by consecutively arranged linking sections (7) made from the loop warp threads (5), the linking sections (7) of each loop (2) being different in length, while the weft density of each loop (2) increases in a direction from the longer linking section (7) to the shorter one.

7. A knitted band as claimed in claim 6, characterized in that each loop (2) is twisted with respect to the linking sections (7).

8. A knitted band as claimed in claim 6, characterized in that each loop (2) is in fact plain circular knit.

9. A knitted band as claimed in claim 6 characterized in that each loop (2) has a circular cross-section.

* * * * *